(12) United States Patent
Corona et al.

(10) Patent No.: US 12,424,873 B1
(45) Date of Patent: Sep. 23, 2025

(54) ELEVATOR BACKUP POWER SYSTEM AND METHOD

(71) Applicant: Digital Signal Power Manufacturing, Inc., San Bernardino, CA (US)

(72) Inventors: Rose Corona, Fontana, CA (US); Milton Hanson, Vista, CA (US); Morteza Rezaei, Irvine, CA (US)

(73) Assignee: Digital Signal Power Manufacturing, Inc., San Bernardino, CA (US)

( * ) Notice: Subject to any disclaimer, the term of this patent is extended or adjusted under 35 U.S.C. 154(b) by 0 days.

(21) Appl. No.: 18/892,210

(22) Filed: Sep. 20, 2024

Related U.S. Application Data

(60) Provisional application No. 63/584,803, filed on Sep. 22, 2023.

(51) Int. Cl.
*H02J 9/06* (2006.01)
*H02J 7/00* (2006.01)
*H02J 7/02* (2016.01)

(52) U.S. Cl.
CPC ............ *H02J 9/062* (2013.01); *H02J 7/0063* (2013.01); *H02J 7/02* (2013.01); *H02J 9/066* (2013.01)

(58) Field of Classification Search
CPC .. H02J 9/062; H02J 7/0063; H02J 7/02; H02J 9/066
(Continued)

(56) References Cited

U.S. PATENT DOCUMENTS 8,789,659 B2  7/2014  Agirman et al.
11,008,197 B2  5/2021  Nikander et al.
(Continued)

FOREIGN PATENT DOCUMENTS

CN  216737037  6/2022

OTHER PUBLICATIONS

LinkedIn Post from Lorbel Inc. regarding products from Staco Energy Products, published Sep. 18, 2023.

*Primary Examiner* — Michael R. Fin
(74) *Attorney, Agent, or Firm* — Concourse Law Group; Katherine B. Sales, Esq.

(57) ABSTRACT

An emergency power system for providing emergency power to an elevator motor/generator is disclosed. The emergency power system comprises a battery backup, a static bypass switch operatively connected to the elevator motor/generator; and a power conditioning circuit. The power conditioning circuit may comprise a first circuit for directing power from the grid to the motor/generator via the static bypass switch when power from the grid available; a second circuit for directing power from the battery backup to the motor/generator when power from the grid is unavailable; and a third circuit for directing power from the motor/generator to the battery backup when the elevator motor/generator is braking. The first circuit may comprise an AC-to-DC rectifier connected to a power grid, a DC-to-DC converter, and a DC-to-AC inverter operatively connected to the static bypass switch. As such, the first circuit is configured to operate as a power conditioning circuit, and that conditioned power supplied to the elevator motor/generator when available. When conditioned power is unavailable because the power grid is non-operational, for example, the battery backup is configured to power the elevator motor/generator via circuit including the DC-to-DC converter, the DC-to-AC inverter, and the static bypass switch.

8 Claims, 7 Drawing Sheets

(58) Field of Classification Search
USPC .......................................................... 307/64
See application file for complete search history.

(56) References Cited

U.S. PATENT DOCUMENTS

| | | | |
|---|---|---|---|
| 11,984,759 B2* | 5/2024 | Kamalasadan | ....... H02J 7/0063 |
| 2013/0264865 A1* | 10/2013 | Sugeno | ................... H02J 3/322 |
| | | | 307/19 |
| 2020/0122961 A1* | 4/2020 | Valdivia Guerrero | ....................... |
| | | | B66B 1/306 |

* cited by examiner

ELEVATOR BACKUP POWER SYSTEM AND METHOD

CROSS-REFERENCE TO RELATED APPLICATION(S)

This application claims the benefit of U.S. Provisional Patent Application Ser. No. 63/584,803 filed Sep. 22, 2023, titled "Elevator backup power system and method," which is hereby incorporated by reference herein for all purposes.

TECHNICAL FIELD

The invention generally relates to a system for powering elevators. In particular, the invention relates to an elevator power system that delivers grid power, delivers backup power, and optionally provides power conditioning of grid power.

BACKGROUND

Elevator backup power systems are designed to provide uninterrupted power supply during power outages or emergencies. Traditional backup systems are faced with a number of challenges including the management of excess energy generated by elevator motors during operation, particularly when using regenerative modules. The existing solutions, such as dummy loads and separate emergency lighting systems, have limitations in effectively managing the generated energy.

SUMMARY

The preferred embodiment of the present invention, namely a novel elevator power system (EPS), addresses the limitations encountered in the prior art by efficiently absorbing and utilizing the excess energy while complying with relevant regulations. The EPS is an advanced elevator backup power system designed to power the elevator motor and provide backup power to elevator emergency lighting and other auxiliary devices. It adheres to NEC regulations NEC 700.2. which governs elevator backup power requirements. Additionally, the EPS is capable of absorbing and storing the excess energy generated by the elevator motor during operation, utilizing it for battery charging during power outages. In particular, the EPS is able to absorb the regenerative energy generated by elevator systems and charge its battery backup during a power outage. This ensures an uninterrupted power supply to critical loads while simultaneously recharging the system's batteries, making it fully functional and operational when needed.

In addition, the EPS introduces an online configuration feature that conditions power directly from the grid. This ensures uninterrupted, clean power delivery in non-emergency situations where grid power quality may be compromised. This feature is particularly beneficial in environments where power fluctuations or interruptions could trigger elevator system faults. The EPS continuously supplies stable power, preventing elevator faults caused by grid disturbances and ensuring consistent performance.

The present invention in some embodiment includes an emergency power system for powering an elevator motor/generator. The emergency power system comprises: at least one battery backup; a static bypass switch connected to the motor/generator; a first circuit for directing power from a power grid to the motor/generator via the static bypass switch when power from the grid available; a second circuit for directing power from the battery backup to the motor/generator when power from the grid is unavailable; and a third circuit for directing power from the motor/generator to the battery backup when the motor/generator is braking, wherein the static bypass switch is configured to switch between the power from the grid and power from the battery backup depending on the availability of power from the grid, i.e., whether or not the power grid is operational.

The first circuit may comprise a first module for converting a first power signal to a second power signal, wherein the first power signal comprises alternating current (AC) from the grid, and the second power signal comprises direct current (DC), and wherein the first power signal is characterized by a first voltage, and the second power signal is characterized by a second voltage. The first module generally comprises, or consists of, a rectifier circuit. The third circuit may further comprise a second module for converting the second power signal to a third power signal, wherein the third power signal comprises direct current, and the third power signal is characterized by a third voltage different than the second voltage. The second module generally comprises, or consists of, a DC-to-DC converter. The third circuit may further comprise a third module for converting the third power signal to a fourth power signal, wherein the fourth power signal comprises alternating current, and wherein the fourth power signal is characterized by a fourth voltage. The third module generally comprises, or consists of, an DC-to-AC inverter.

Similar to the first circuit, the second circuit is configured to supply operation power to the elevator motor/generator. However, the second circuit is configured to supply that power to the elevator motor/generator when grid power when unavailable, which may be the case in an emergency. The static bypass switch is configured to switch the source of power from the grid to the battery backup when grid power becomes unavailable.

When the grid is operational and grid power available, this power may be used to maintain the charge on the battery backup. When the power grid is down, however, the third circuit is configured to recover power from the motor/generator and use this power to charge the battery backup when the motor/generator is braking, for example. The static bypass switch is configured to switch between grid power to battery backup power in less than one second.

In some embodiments, the emergency power system comprises: at least one battery backup; a static bypass switch operatively connected to the elevator motor/generator; and a power conditioning circuit. The power conditioning circuit may comprise, or consist of, the following: a first circuit for directing power from the grid to the motor/generator via the static bypass switch when power from the grid available; a second circuit for directing power from the battery backup to the motor/generator when power from the grid is unavailable; and a third circuit for directing power from the motor/generator to the battery backup when the elevator motor/generator is braking.

The first circuit may comprise, or consist of, an AC-to-DC rectifier operatively connected to a power grid; a DC-to-DC converter operatively connected to the AC-to-DC rectifier; and a DC-to-AC inverter operatively connected to the DC-to-DC converter and static bypass switch. As such, the first circuit is configured to operate as a power conditioning circuit, and that conditioned power supplied to the elevator motor/generator when available. When conditioned power is unavailable because the power grid is non-operational, for example, the battery backup is configured to power the elevator motor/generator via circuit including the DC-to-DC converter, the DC-to-AC inverter, and the static bypass switch. The battery backup is also configured to receive power from the elevator motor/generator via the static bypass switch and the DC-to-AC inverter when the elevator is descending, for example.

In some embodiments, the invention is a method for providing power to an elevator motor/generator with an emergency power system. The method may comprise the steps of: conditioning a first power signal from a power grid when the power grid is operational; delivering or supplying the conditioned power to the elevator motor/generator via a static bypass switch; and delivering or supplying power from a battery backup to the elevator motor/generator via the static bypass switch when the power grid is not operational. The static bypass switch is configured to automatically switch its power source between conditioned power and battery backup power depending whether or not the power grid is operational.

The method of conditioning the first power signal from the power grid comprises, or consists of: converting the first power signal to a first DC power signal with a DC-to-DC converter; converting (step up or step down) the first DC power signal to a second DC power signal with a DC-to-DC converter; and converting the second DC power signal to an AC power signal with a DC-to-AC inverter; supplying the AC power signal to the elevator motor/generator via the static bypass switch if and when the power grid is operational; and supplying power from a battery backup to the elevator motor/generator via the static bypass switch if and when the power grid is not operational. Moreover, when conditioned power is unavailable, power may be supplied from a battery backup to the elevator motor/generator via the DC-to-AC inverter and static bypass switch.

BRIEF DESCRIPTION OF THE DRAWINGS

The present invention is illustrated by way of example and not limitation in the figures of the accompanying drawings, and in which.

DETAILED DESCRIPTION OF THE PREFERRED EMBODIMENT

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

The elevator power system (EPS) of the preferred embodiment comprises an electrical circuit configured to power one or more elevators, for example, using power from a public utility or from an emergency power supply. The EPS is configured to detect the absence of utility power and switch over to emergency power in a small fraction of a second, thereby enabling the elevator to operate in a continuous uninterrupted manner even in the case of a power blackout or other emergency.

Figure 1:
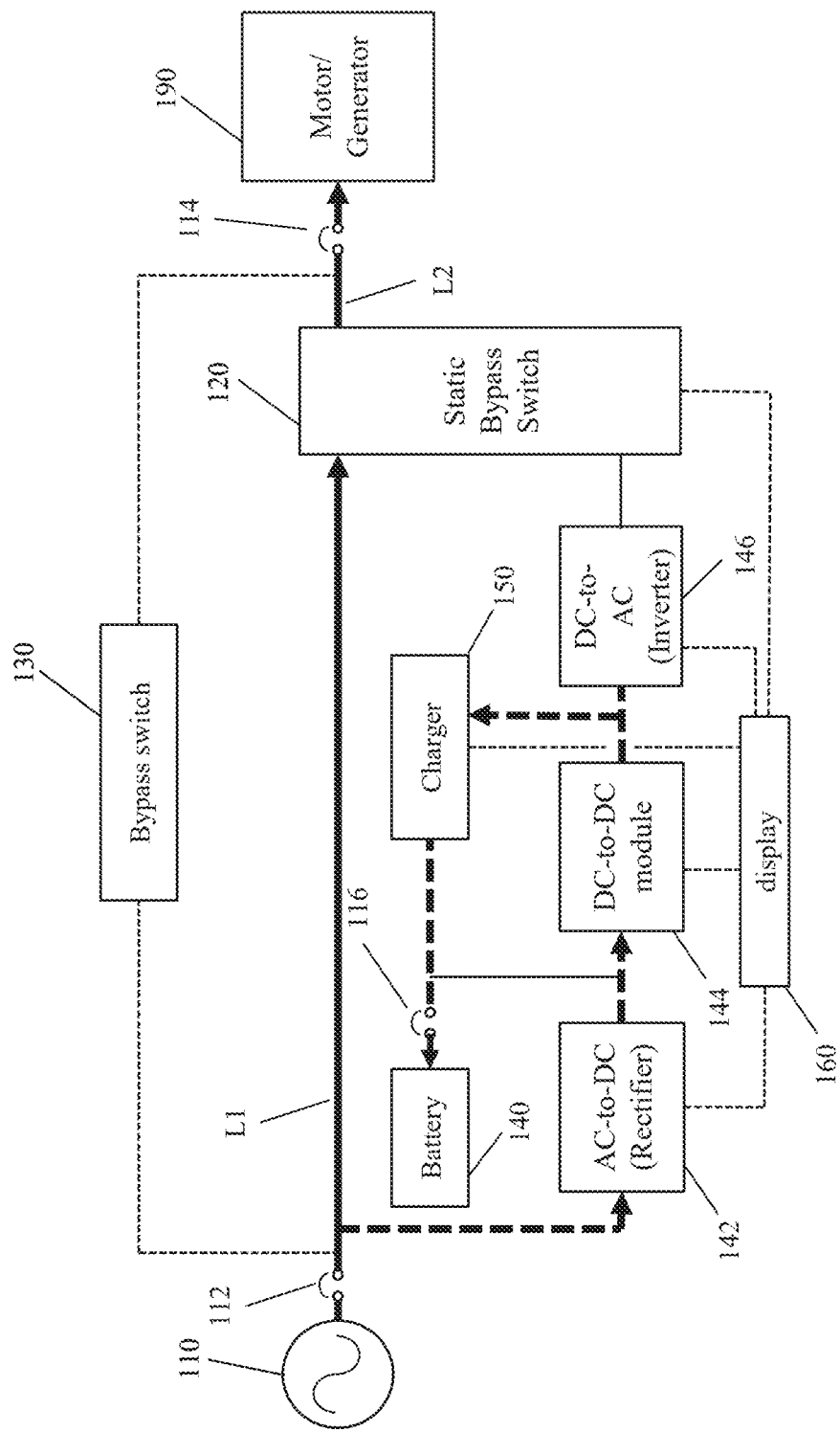
FIG. 1 is a functional block diagram of an elevator power system using grid power, in accordance with an embodiment of the present invention.

As illustrated in FIG. 1, the EPS preferably includes: a connection to a regional power grid 110 via a fuse 112 and/or breaker, connection to an elevator motor/generator 190 via a fuse 114 and/or breaker, and static bypass switch 120. Under normal operating conditions, the motor/generator 190 is powered directly by the power grid 110 via the static bypass switch 120 with an appropriate voltage at single phase or three-phase. This power circuit is indicated by bold lines L1 and L2. To perform maintenance or repairs, the bypass switch 130 may be thrown open to safely isolate the EPS from the power grid 110.

The EPS further includes an emergency power circuit for providing power to operate the elevator when grid power is unavailable. In particular, the EPS monitors the grid power and, if lost, switches to power from an internal battery backup. In the preferred embodiment, the EPS passively monitors the power grid using the static bypass switch 120. If and when grid power is lost, the source of power from the elevator motor/generator 190 changes. In particular, when grid power is lost, the static bypass switch 120 begins sourcing power from the internal emergency power supply.

This emergency power supply includes an AC-to-DC converter 142, DC-to-DC converter 144, DC-to-AC converter 146, internal battery 140, charging circuit 142, and LCD display 160. The AC-to-DC converter 142 is preferably a rectifier configured to process the incoming sine wave signal and remove all harmonics to obtain a zero harmonic DC signal. This modification ensures a clean and consistent energy flow for efficient battery charging. The DC-to-DC converter 144 is sometimes referred to as a converter or module and is configured to either step up the DC voltage above the input voltage, or step down the voltage to a lower voltage than the input voltage. The modified DC signal from the DC-to-DC converter module 144 is then fed into the DC-to-AC converter 146 which is preferably an inverter configured to chop the DC signal and introduce harmonics to generate an AC output. The inverter can generate a three-phase or single-phase AC signal sufficient to power the elevator motor 140 during a grid power outage.

In addition to powering the motor/generator 190, grid power also maintains a charge on the emergency power circuit. In particular, AC power from the grid 110 is converted to DC current by the rectifier 142 and then reset to the appropriate DC voltage by the DC-to-DC module 144. This DC current is then routed to the charger 150 for purposes of maintaining a full charge on the battery 140 at all times. This power distribution circuit is shown in a dashed bold line. In the preferred embodiment, the DC current from DC-to-DC module 144 is also supplies power to the inverter 146 to hold it in the standby mode, i.e., in an idle mode, in order to be ready to replace grid power in a fraction of a second if and when grid power goes offline.

Figure 2:
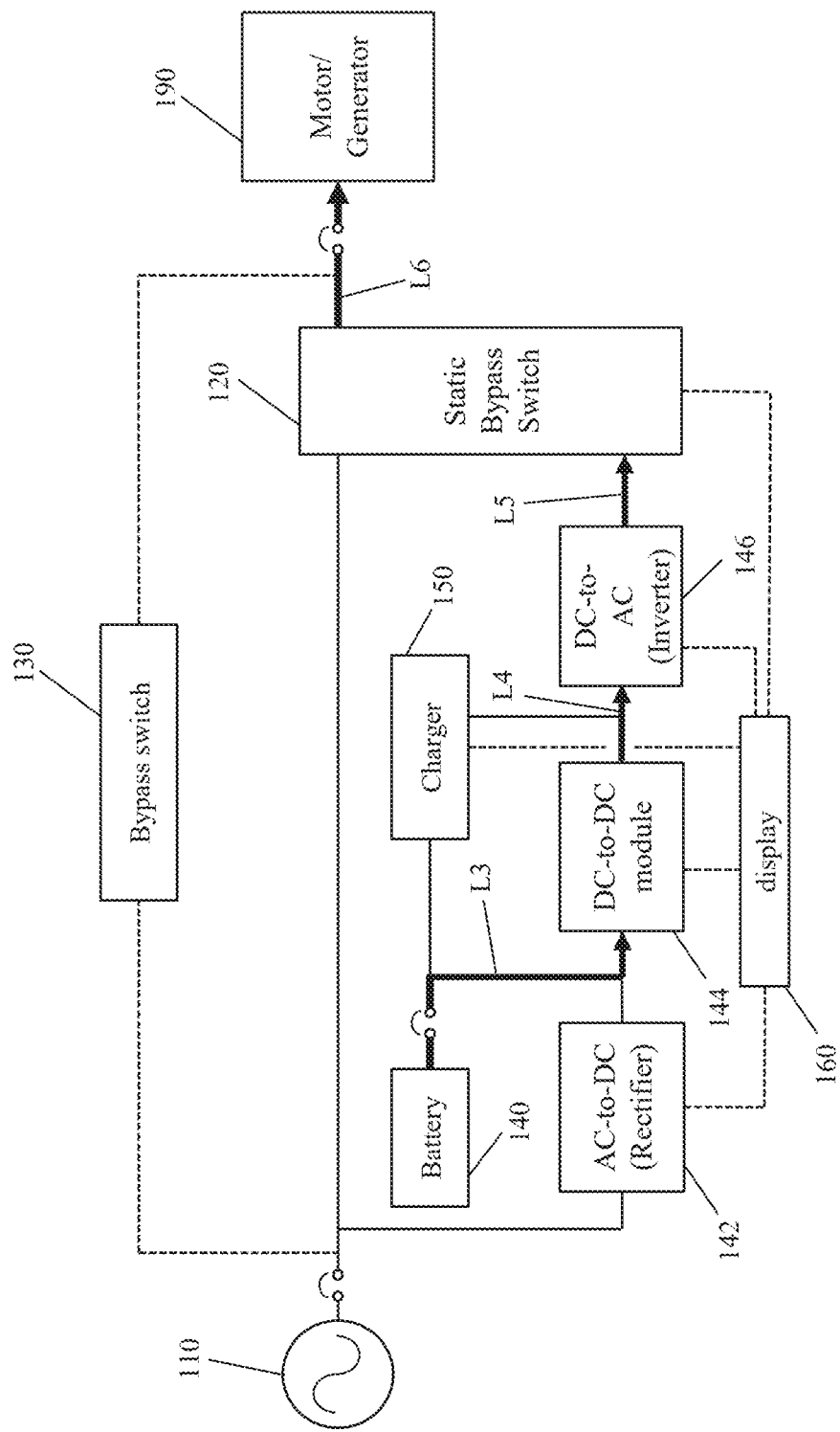
FIG. 2 is a functional block diagram of an elevator power system using battery power, in accordance with an embodiment of the present invention.

As illustrated in FIG. 2, the static bypass switch 120 sources power from the internal battery 140 when grid power is down. This power is fed to the DC-to-DC module 144, which steps the voltage up or down as required, and then converts the direct current to alternating current using the DC-to-AC module 146. This power circuit is indicated by bold lines L3-L6. As can be seen, the elevator is able to continue operation even in an emergency resulting in loss of grid power.

Figure 3:
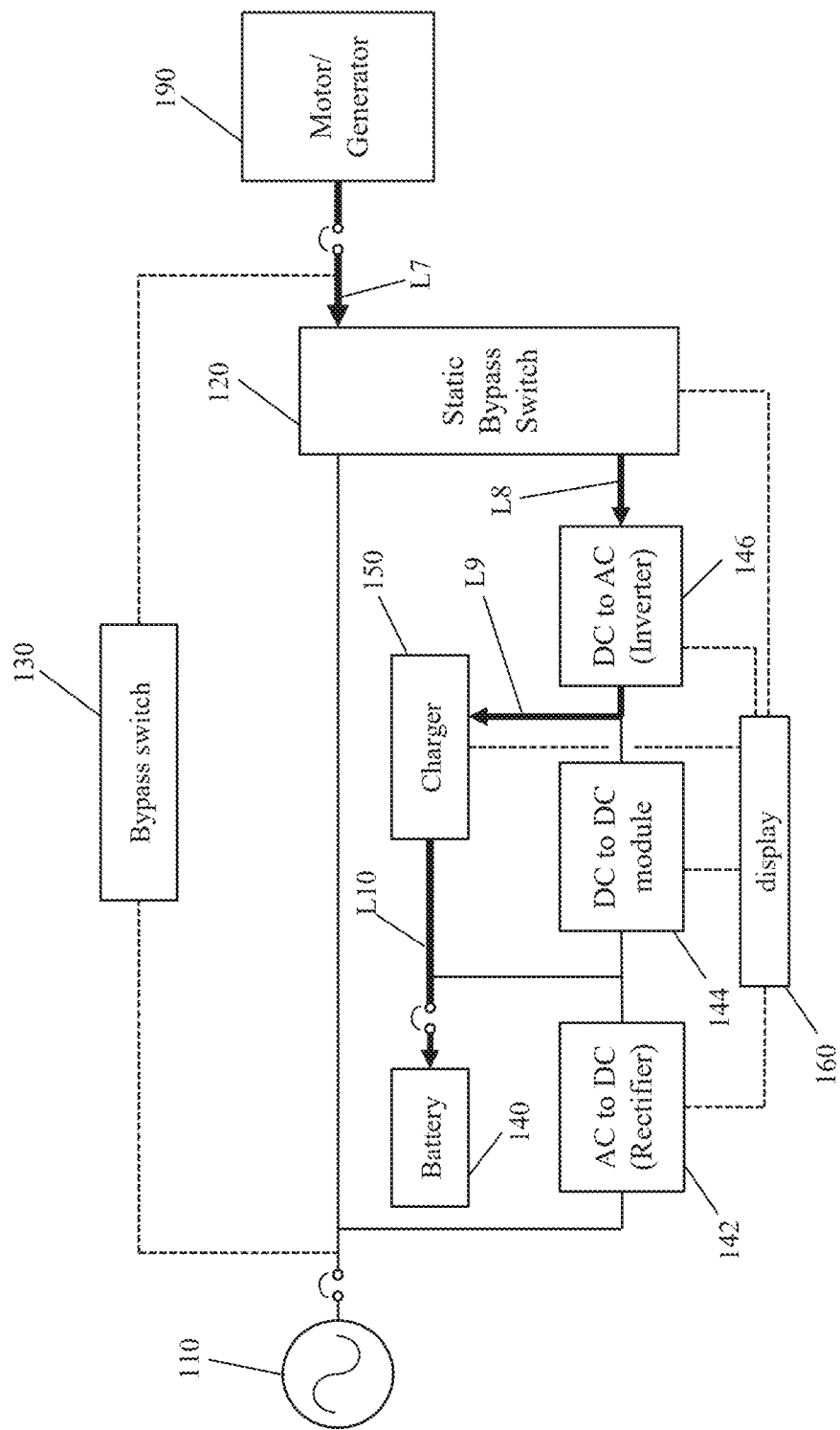
FIG. 3 is a functional block diagram of an elevator power system charging its internal battery, in accordance with an embodiment of the present invention.

As illustrated in FIG. 3, the EPS includes a "regenerative" mode configured to capture power from the operation of the elevator during a power outage. When the elevator is descending, for example, the motor/generator 190 converts the loss of potential energy to electrical energy, which is then used to charge internal battery 140. In particular, the EPS routes current from the static bypass switch 120 to the inverter 146. The inverter 146, preferably a bi-directional inverter, detects the AC current from the static bypass switch 120 and coverts this to a DC current provided as output to the left. The DC current is then routed to the battery charging circuit 150 and that power applied to charge internal battery 140. This power circuit is indicated by bold lines L7-L10.

The charging circuit is configured to detect the current direction and, with a change in direction, generate DC power to charge the battery 140 with current and voltage in the form of a closed loop control. This ensures efficient charging of the battery 140 and utilizes the excess energy from the bus. The charging circuit plays a crucial role in the system by allowing it to comply with end-of-line regulation. This ensures that the EPS can intelligently manage the power flow and prioritize the charging of the battery 140 while providing power to multiple categories of loads simultaneously. These categories of load include emergency, legally required standby, and optional standby:

a. ATS-1: Emergency Loads ATS-1 is responsible for supplying power to emergency loads, including emergency egress lighting fixtures and exit signs. According to NEC 700.2, these systems are designed to provide illumination and power to specific areas and equipment during a power failure or other emergency situation. The ATS-1 switch must quickly switch over to the generator within 10 seconds.

b. ATS-2: Legally Required Standby Loads ATS-2 refers to legally required standby loads including c. elevators. These loads, as defined by NEC 701.2, are critical to prevent hazards or obstruction of rescue and firefighting operations. The ATS-2 switch must switch over to the generator within 60 seconds or less.

d. ATS-3: Optional Standby Loads ATS-3 supplies power to optional standby loads that are not categorized as emergency or legally required standby. These loads, defined by NEC 702.2, include equipment or systems that, when stopped during a power outage, may cause discomfort, interruption of processes, damage to products, or similar outcomes. Examples include walk-in coolers in a commercial kitchen.

Figure 4:
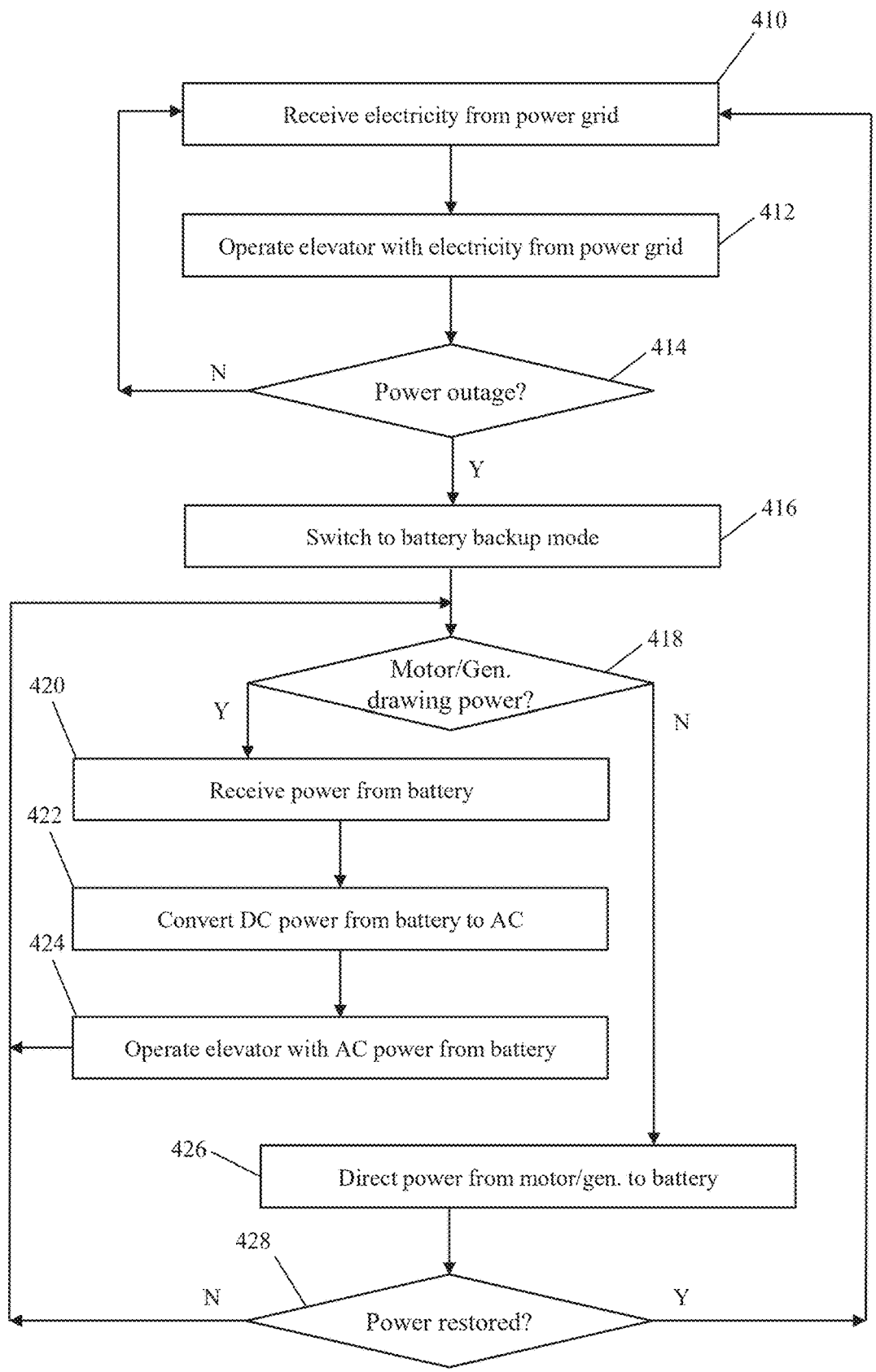
FIG. 4 is flowchart of the process of switching between grid power and internal battery backup, in accordance with an embodiment of the present invention.

Illustrated in FIG. 4 is flowchart of the process of switching between grid power and emergency power, in accordance with some embodiments of the present invention. In normal operation, the EPS receives 410 electricity from power grid 110 which is then used to operate 412 one or more elevators as needed. If and when a power outage is detected, decision block 414 is answered in the affirmative. Thereafter, the EPS switches 416 to the battery backup mode utilizing the internal battery 140. If the elevator is in the processes of ascending, decision block 418 is answered in the affirmative and current drawn from the internal battery used 420 to lift the elevator. This DC current is then converted 422 to alternating current and routed 424 to the motor generator 190. If, however, the elevator is descending, decision block 418 is answered in the negative and the power from the motor/generator 190 used to charge the internal battery 140.

The process of drawing power from the internal battery and charging the internal battery is repeated until grid power 110 is restored and decision block 428 answered in the affirmative.

Figure 5:
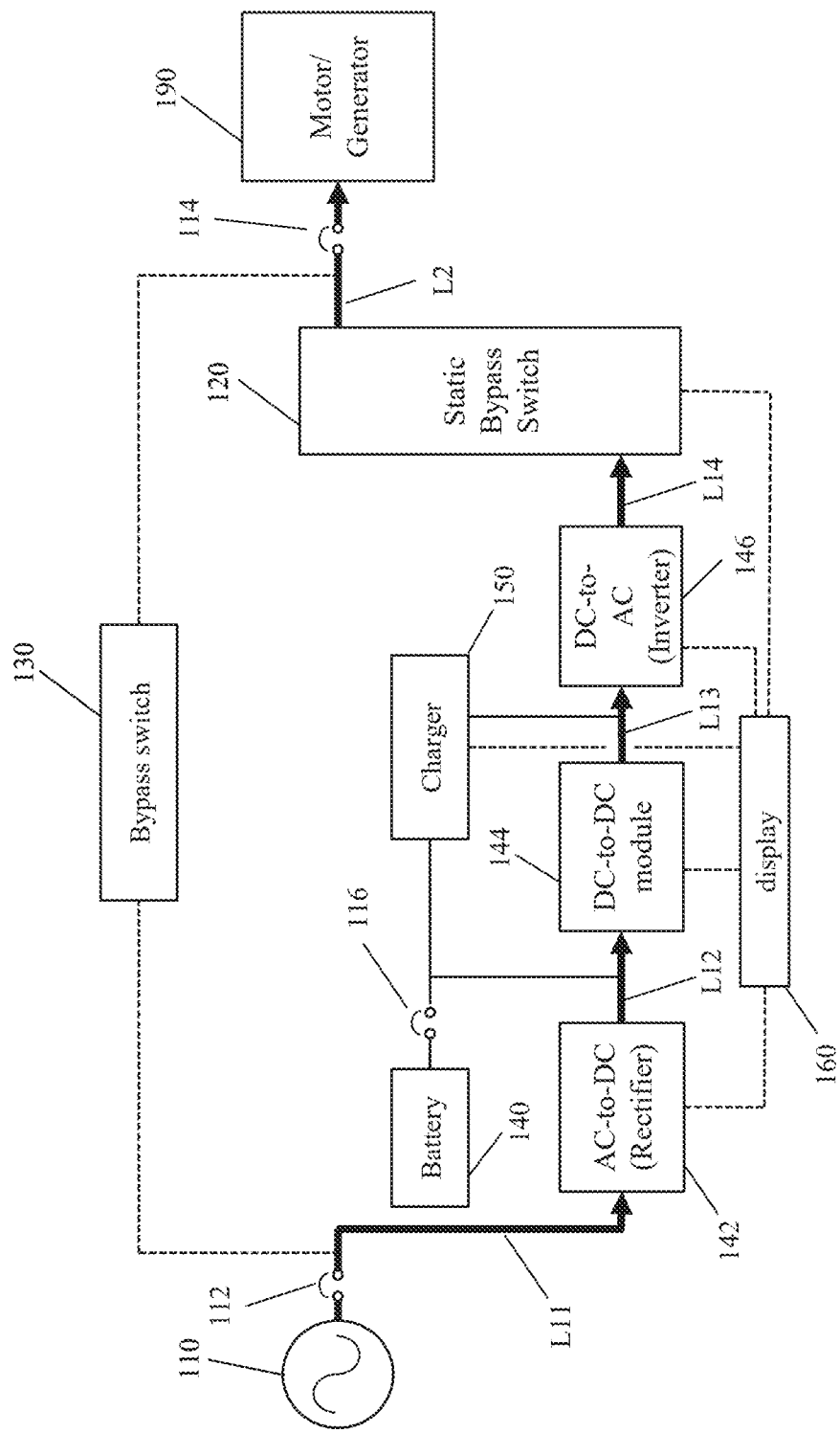
FIG. 5 is a functional block diagram of an elevator power system configured to filter or otherwise condition grid power, in accordance with a second embodiment of the present invention.

Illustrated in FIG. 5 is a second embodiment of the elevator power system (EPS). Like the first embodiment, the second embodiment of the EPS comprises an electrical circuit designed to power one or more elevators using utility power, an emergency power supply, or regenerative power from the elevator system in online mode. The EPS is configured to detect the absence of utility power and switch over to emergency power seamlessly, ensuring uninterrupted elevator operation.

In the second embodiment, the EPS is configured to operate in two distinct modes: "emergency" mode and "online" mode. In the "online" mode, the EPS (i) receives electricity from the grid, (ii) conditions the electricity to provide clean, stabilized power to the elevator, and (iii) captures regenerative energy produced by elevator motors, particularly during descent or braking. This regenerative energy can be fed back into the power grid, thereby enhancing system efficiency and minimizing energy waste. The capability to return excess energy to the grid allows the EPS to maintain optimal performance even in environments with inconsistent grid power quality, where power fluctuations or distortions might otherwise disrupt elevator operation.

If grid power is lost, the EPS immediately switches to its "emergency" mode to ensure continuous elevator operation. In the "emergency" mode, the EPS powers elevator operations with the internal battery backup 140, and recharges the battery 140 using energy generated by decent or braking of the elevator, as described above.

Figure 6:
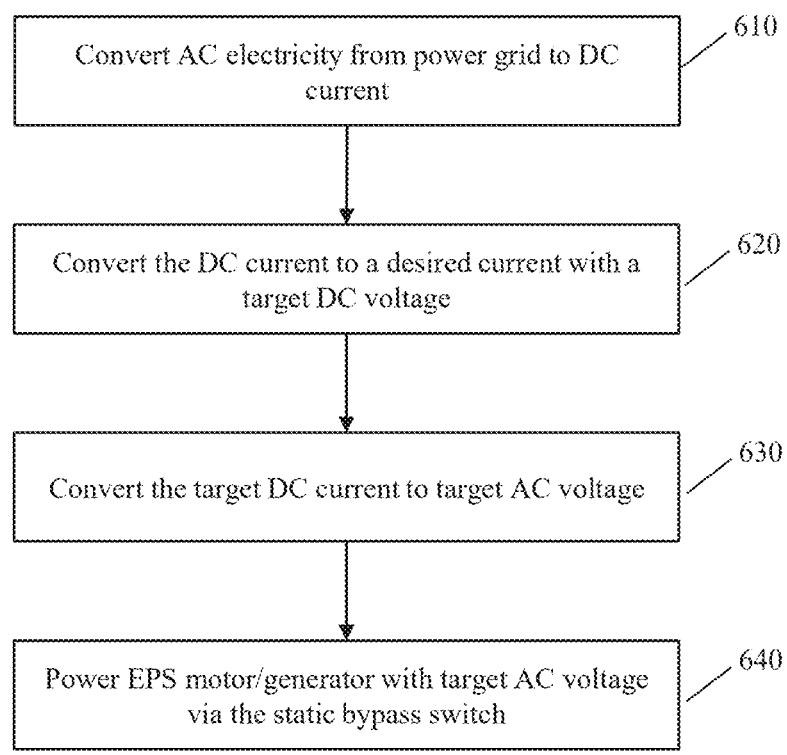
FIG. 6 is a flowchart of the process of filtering or otherwise conditioning electricity from the grid power, in accordance with a second embodiment of the present invention.

In this second embodiment, the EPS filters or otherwise conditions the incoming grid power in the online mode. This may include, for example, removing disturbances from the sinusoidal electrical signal and ensuring a smooth, continuous supply to the elevator. The steps of conditioning the incoming grid power are shown in FIG. 6. As can be seen, the grid power is directed to the AC-to-DC converter via L11 and rectified 610, the rectified power passed to the DC-to-DC module via L12 and the DC voltage stepped up or down 620 as needed, and the new DC power passed to the DC-to-AC converter via L13 where it is converted 630 to an AC signal. The conditioned signal, preferably an AC power signal L14, is transmitted 640 to the EPS motor/generator via the static bypass switch.

Figure 7:
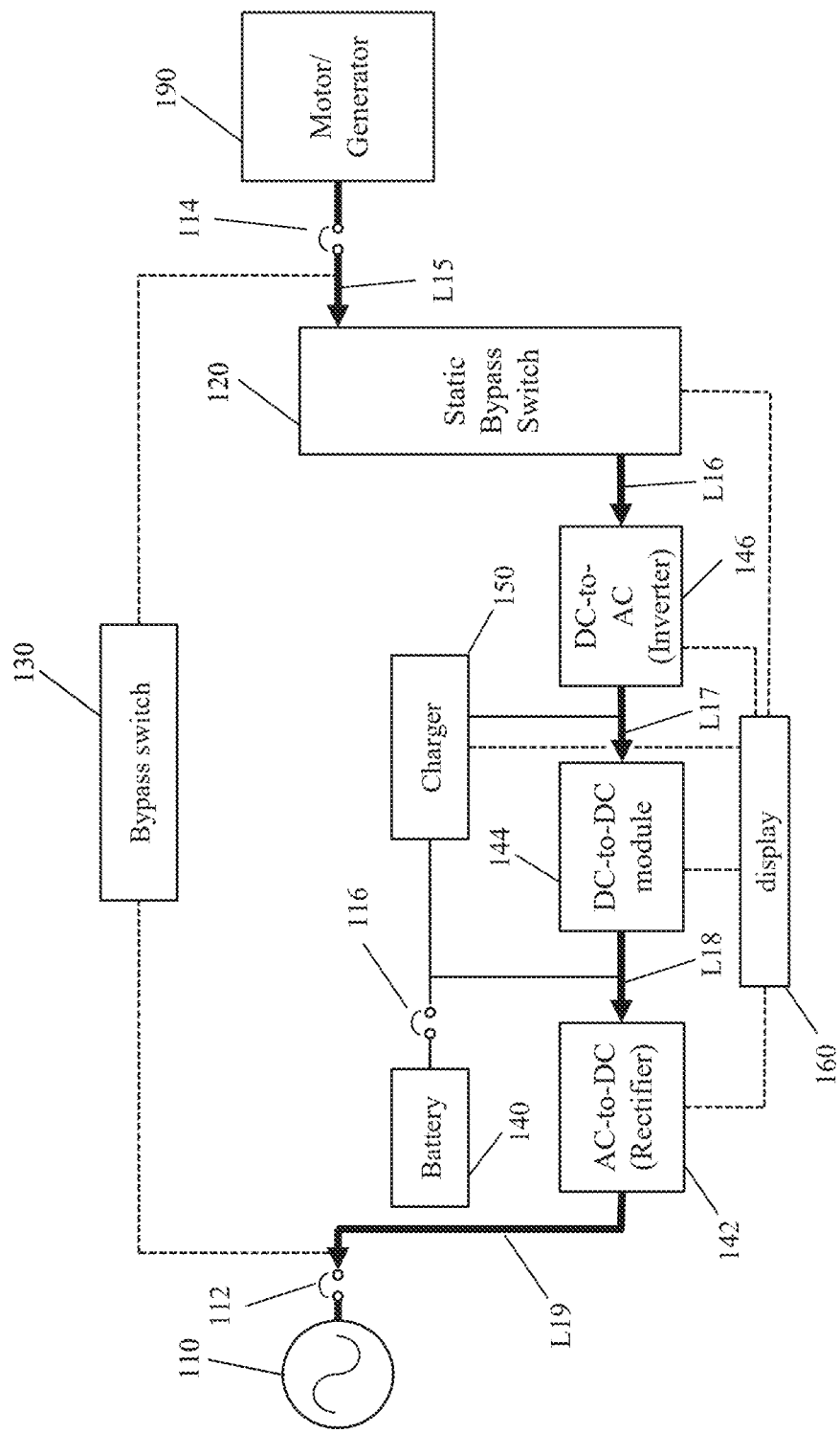
FIG. 7 is a functional block diagram of an elevator power system configured to filter or otherwise condition regenerative power prior to transmission to the power grid, in accordance with a second embodiment of the present invention.

Illustrated in FIG. 7, is a functional block diagram of the second embodiment of the EPS. In this embodiment, the EPS is configured to capture regenerative power from the motor generator, filter or otherwise condition the recovered power, and transmit the power back to the grid. As shown, the regenerative power L15 from the motor/generator is returned to the conditioning circuit via the static bypass switch 120. In particular, the regenerative power signal L16 from the static bypass switch is fed to the bi-directional inverter 146 where the voltage is converted from AC to DC. From the inverter, the DC power signal L17 is transmitted to the DC-to-DC converter 144 and the voltage either stepped up or stepped down. In general, the DC voltage is altered (up or down) in the opposite manner as that performed in the online mode presented in FIG. 5. That is, if the DC voltage is stepped down by the ΔV volts in the online mode in FIG. 5, then the voltage is stepped up by the ΔV volts in the regenerative mode in FIG. 7. The altered power signal L18 from the DC-to-DC converter 144 is then transmitted to the bi-directional rectifier 142 where it's converted to an AC power signal L19. The AC power signal L19 is a filtered and/or conditioned power signal able to be returned to the power grid 110.

This online configuration is particularly advantageous in areas with poor grid power quality, where even minor power disturbances could lead to elevator faults or malfunctions. The EPS continuously monitors grid power and instantly delivers conditioned power to stabilize the elevator's operation under such suboptimal conditions. The regenerative power feedback feature also transforms the EPS into a small-scale power generator by feeding captured energy back into the power grid. This enhances energy efficiency and conservation by reducing overall power consumption during regular elevator operation. Additionally, the regenerative mode ensures compliance with energy regulations, reducing building energy consumption while maintaining optimal system performance.

The EPS of the preferred embodiment has a number of advantages over prior art systems, namely:

a. Quieter Operation—the EPS system operates silently as it does not have an internal combustion engine, thereby eliminating noise pollution associated with traditional generators.

b. Portability—the EPS is compact and lightweight, making it easy to move, store, and install compared to bulky generators.

c. Lower Maintenance—the EPS requires minimal maintenance due to fewer moving parts, eliminating the need for oil changes, fuel filters, and spark plugs.

d. Better Fuel Efficiency—the EPS is highly fuel-efficient, utilizing advanced technologies like variable-speed engines and smart load sensing to optimize fuel consumption.

e. Environmental Friendliness—the EPS produces zero emissions, reducing environmental impact and promoting sustainability. It also operates quietly, without disturbing wildlife or causing noise pollution.

f. By addressing the challenges posed by regenerative type elevators, our Emergency Power System offers a reliable and efficient solution for buildings and facilities, ensuring uninterrupted power supply during critical situations.

One or more embodiments of the present invention may be implemented with one or more computer readable media, wherein each medium may be configured to include thereon data or computer executable instructions for manipulating data. The computer executable instructions include data structures, objects, programs, routines, or other program modules that may be accessed by a processing system, such as one associated with a general-purpose computer or processor capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. Examples of mass storage devices incorporating computer readable media include hard disk drives, magnetic disk drives, tape drives, optical disk drives, and solid state memory chips, for example. The term processor as used herein refers to a number of processing devices including personal computing devices, mobile phones, servers, general purpose computers, special purpose computers, application-specific integrated circuit (ASIC), and digital/analog electronic circuits with discrete components, for example.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

We claim:

1. An emergency power system for powering an elevator motor/generator, the emergency power system comprising:
   at least one battery backup;
   a static bypass switch coupled to the elevator motor/generator;
   a first circuit for directing power from a power grid to the motor/generator via the static bypass switch when power from the grid is available;
   a second circuit for directing power from the battery backup to the motor/generator when power from the grid is unavailable; and
   a third circuit for directing power from the motor/generator to the battery backup when the motor/generator is braking;
   a fourth circuit for directing power from the motor/generator to an external power source when the motor/generator is braking;
   wherein the first circuit comprises a first module, second module, third module, and the static bypass switch, wherein:
   a) the first module is configured to:
      i) receive a first power signal from an external power source, wherein the first power signal is characterized by a first voltage;
      ii) convert the first power signal to a second power signal, wherein the second power signal is a direct current signal, and the second power signal is characterized by a second voltage; and
      iii) output the second power signal;
   b) the second module is configured to:
      i) receive the second power signal directly from the first module;
      ii) convert the second power signal to a third power signal, wherein the third power signal is a direct current signal, and the third power signal is characterized by a third voltage different than the second voltage; and iii) output the third power signal; and
c) the third module is configured to:
  i) receive the third power signal directly from the second module;
  ii) convert the third power signal to a fourth power signal, wherein the fourth power signal is an alternating current signal, wherein the fourth power signal is characterized by a fourth voltage different than the third voltage; and
  iii) output the fourth power signal directly to the static bypass switch;
wherein the second circuit comprises the second module, third module, and static bypass switch, wherein:
  a) the second module is further configured to:
    i) receive a fifth power signal directly from the at least one battery backup, wherein the fifth power signal is characterized by a fifth voltage;
    ii) convert the fifth power signal to a sixth power signal, wherein the sixth power signal is a direct current signal, and the sixth power signal is characterized by a sixth voltage different than the fifth voltage; and
    iii) output the sixth power signal; and
  b) the third module is further configured to:
    i) receive the sixth power signal directly from the second module;
    ii) convert the sixth power signal to a seventh power signal, wherein the seventh power signal is an alternating current signal, wherein the seventh power signal is characterized by a seventh voltage different than the sixth voltage; and
    iii) output the seventh power signal directly to the static bypass switch;
wherein the third circuit comprises the third module and static bypass switch, wherein:
  a) the third module is further configured to:
    i) receive an eighth power signal from the static bypass switch, wherein the eighth power signal is characterized by an eighth voltage;
    ii) convert the eighth power signal to a ninth power signal; and
    iii) output the ninth power signal to the at least one battery backup,
wherein the fourth circuit comprises the first module, second module, third module, and static bypass switch, wherein:
  a) the third module is further configured to:
    i) receive a tenth power signal directly from the static bypass switch, wherein the tenth power signal is characterized by a tenth voltage;
    ii) convert the tenth power signal to an eleventh power signal, wherein the eleventh power signal is a direct current signal, and wherein the tenth power signal is characterized by an eleventh voltage different than the tenth voltage; and
    iii) output the eleventh power signal;
  b) the second module is further configured to:
    i) receive the eleventh power signal directly from the third module;
    ii) convert the eleventh power signal to a twelfth power signal, wherein the twelfth power signal is a direct current signal, and wherein the twelfth power signal is characterized by a twelfth voltage different than the eleventh voltage; and
    iii) output the twelfth power signal;
  c) the first module is further configured to:
    i) receive the twelfth power signal directly from the second module;
    ii) convert the twelfth power signal to a thirteenth power signal, wherein the thirteenth power signal is an alternating current signal, and wherein the thirteenth power signal is characterized by a thirteenth voltage different than the twelfth voltage; and
    iii) output the thirteenth voltage to the external power source.

2. The emergency power system of claim 1, wherein the first module comprises a rectifier.

3. The emergency power system of claim 2, wherein the second module comprises a DC-to-DC converter.

4. The emergency power system of claim 3, wherein the third module comprises an inverter.

5. The emergency power system of claim 4, wherein the battery backup is configured to be charged by the third power signal based on power from the grid when available.

6. The emergency power system of claim 5, wherein the battery backup is configured to be charged by the third circuit when power from the grid when unavailable.

7. The emergency power system of claim 6, wherein the battery backup is configured to power the elevator motor/generator when power from the grid when unavailable.

8. The emergency power system of claim 7, wherein the static bypass switch is configured to switch from grid power to battery backup power in less than one second.

* * * * *